United States Patent Office 3,145,116
Patented Aug. 18, 1964

3,145,116
INSOLUBILIZATION OF STARCHES WITH DIALDEHYDE POLYSACCHARIDES
Mitchell F. Zienty, Elkhart, Ind., assignor to Miles Laboratories, Inc., Elkhart, Ind., a corporation of Indiana
No Drawing. Filed July 7, 1960, Ser. No. 41,228
8 Claims. (Cl. 106—210)

This invention relates to the insolubilization of starches. In one of its more particular aspects it relates to the preparation of starch films by means of a novel insolubilizing agent.

Starches of various types are used in many industrial applications. The commercially available dextrinized, hydroxyethylated, pre-gelatinized and chemically modified starches, for example, have found wide acceptance in paper coatings or in use as adhesives because of their low cost and excellent working characteristics. However, none of the available starches is sufficiently water resistant and this disadvantage limits their extensive use in applications where outstanding water resistance is a prerequisite.

Accordingly, it is a principal object of this invention to provide compositions of starches which have improved water resistance.

Another object of this invention is to provide such compositions which can be used in the production of films or coatings which are extremely water resistant.

A further object of this invention is to provide a process for the preparation of such compositions.

Yet a further object of this invention is to provide a method of producing water resistant films and coatings.

Other objects and advantages of this invention will become apparent during the course of the following detailed disclosure and description.

It has now been found that starches such as corn starch, wheat starch, tapioca or potato starches including chemically modified starches such as hydroxyethylated starches can be insolubilized and fabricated into water resistant films by incorporation in the starches of an insolubilizing dialdehyde polysaccharide.

In order to form such improved compositions starch solutions may be formed in the usual way, that is, by cooking at elevated temperatures preferably at or near the boiling point of water until the starch is completely dispersed in the solution. The hydrogen ion concentration of the resulting solution or dispersion is then adjusted from the near neutral pH which such dispersions usually display to a hydrogen ion concentration of from about pH 4.5 to pH 6. If the dispersion has not cooled to a sufficiently low temperature at this point it may be desirable to cool the dispersion to from about 60° C. to 65° C. in order to prevent unnecessary and undesirable degradation of the dialdehyde polysaccharide when it is added to the dispersion. Upon cooling the dispersion the dialdehyde polysaccharide is added with thorough mixing.

The resulting novel compositions when formed into films and cured such as by drying at room temperature for extended periods of time such as for from about 16 hours to 24 hours, or by drying at elevated temperatures for correspondingly lesser periods of time, provide continuous films which exhibit markedly improved properties of water resistance. For example, these films are generally insoluble in boiling water even upon cooking for a period of about 10 minutes and in boiling 2% sodium carbonate for the same period of time.

The dialdehyde polysaccharides to be used in the process of this invention are polymeric aldehydes derived from the periodic acid oxidation of polysaccharides. These may be derived from a wide variety of polysaccharides including starches such as corn starch, wheat starch, potato or tapioca starches, celluloses, dextrans, dextrins, algins, inulins and the like.

The dialdehyde polysaccharide is advantageously used in a proportion of from about 2.5% to 10% by weight of the starch which is to be insolubilized.

The hydrogen ion concentration of dispersions of unmodified starches is generally around neutral. In order for optimum insolubilization the pH of the dispersion should be adjusted to from about pH 4.5 to pH 6. For this purpose any acid may be used. Sulfuric acid and hydrochloric acid are satisfactory for this purpose. However, weak acids such as citric acid or acetic acid are preferred because the compositions obtained upon the addition of dialdehyde polysaccharide are less prone to acid degradation if a weak acid is used rather than one of the strong acids.

Other conditions such as the temperature and time of reaction for preparation of the compositions of this invention are not critical. However, as mentioned above a temperature in the range of from about 60° C. to 65° C. is preferred for mixing the starch with the dialdehyde polysaccharide since at lower temperatures gels may form whereas at higher temperatures a certain amount of degradation is observed.

The compositions of this invention in the form of films find application as do starches themselves in various coatings and adhesives. Because of their enhanced water resistance and their insolubility in water and other solvents these films are especially useful in paper coatings and in high speed lithography.

The invention will be better understood by reference to the following examples which are included for purposes of illustration and are not to be construed as in any way limiting the scope of the instant invention.

EXAMPLE I

Starch solutions were formed by cooking unmodified pearl corn starch according to the manufacturer's directions, usually at or near the boiling point of water, until the starch was completely dispersed. The hydrogen ion concentration of the starch dispersion was checked with a glass electrode and adjusted to pH 6 with dilute hydrochloric acid. The dispersion was then cooled to 60° C. to 65° C. and treated with various amounts of dialdehyde starch (75% oxidized). The resulting mixture was stirred thoroughly and films were poured on stainless steel plates. The films were cured by drying at room temperature for a period of from 16 hours to 24 hours. The resulting continuous films were then removed and tested for solubility in boiling water and in 2% sodium carbonate for 10 minutes. The results are summarized in Table 1 below.

Table 1

| Starch, Percent | Dialdehyde Starch | | Observations | |
|---|---|---|---|---|
| | G. | Percent (based on starch) | Boiling H$_2$O | Boiling 2% Sodium Carbonate |
| 2.5 | Control | | Slowly Soluble | Slowly Soluble. |
| 2.5 | 0.5 | 20 | Insoluble | Insoluble. |
| 2.5 | 0.25 | 10.0 | ___do___ | Do. |
| 5.0 | 0.25 | 5 | ___do___ | Do. |

These data show that starches can be insolubilized by treatment with as little as about 5% of a dialdehyde polysaccharide by weight of said starch.

In summary, starches are insolubilized by the addition of from about 2.5% to 10% of a dialdehyde polysaccharide by weight of said starch at hydrogen ion concentrations of from about pH 4.5 to pH 6. The resulting compositions produce films or coatings which are extremely water resistant as well as resistant to more severe solvent conditions.

Other embodiments than those specifically described may, of course, be used in the practice of this invention and are intended to be included within the scope thereof, which is defined in the appended claims.

What is claimed is:

1. A process for the insolubilization of starches which comprises adjusting the hydrogen ion concentration of an aqueous solution of starch to from about pH 4.5 to pH 6, and adding to said adjusted starch solution from about 2.5% to 10% of a dialdehyde polysaccharide by weight of said starch.

2. A process according to claim 1 wherein the dialdehyde polysaccharide is dialdehyde starch.

3. A process for the preparation of insoluble starch films which comprises adjusting the hydrogen ion concentration of an aqueous solution of starch to from about pH 4.5 to pH 6, adding to said adjusted starch solution from about 2.5% to 10% of a dialdehyde polysaccharide by weight of said starch, thoroughly mixing said starch solution and said dialdehyde polysaccharide, pouring films from said mixture, and curing said films.

4. A process according to claim 3 wherein the films are cured at room temperature for a period of from about 16 hours to 24 hours.

5. A process according to claim 3 wherein the hydrogen ion concentration adjustment is accomplished by the use of a weak acid.

6. A process according to claim 3 wherein said dialdehyde polysaccharide is dialdehyde starch.

7. A product prepared according to the process of claim 1.

8. A product prepared according to the process of claim 3.

References Cited in the file of this patent

UNITED STATES PATENTS 2,988,455 Rosenberg et al. _____ June 13, 1961

OTHER REFERENCES

Dialdehyde Starch (CA-N-10) U.S.D.A., Ag. Research Service Northern Utilization R. and D. Div., Peoria, Illinois, April 1960 (6 pp.).